Sept. 28, 1943.  V. MAY  2,330,727
GATHERING APPARATUS
Filed April 3, 1942
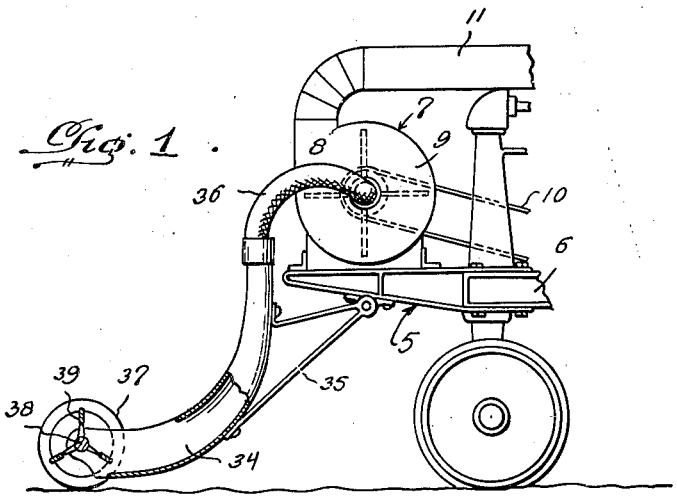
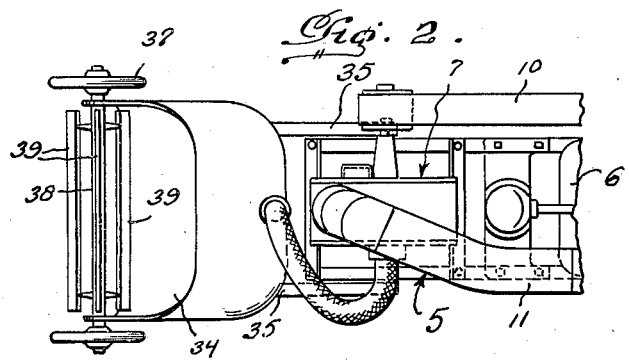
Inventor
Verna May,
By McMorrow Ed Berman
Attorneys Patented Sept. 28, 1943

2,330,727

UNITED STATES PATENT OFFICE 2,330,727

GATHERING APPARATUS

Verna May, Senath, Mo.

Application April 3, 1942, Serial No. 437,577

1 Claim. (Cl. 56—19)

This invention relates to a portable pneumatic gathering apparatus especially adapted for gathering seeds of different kinds from growth.

The primary object of the invention is the provision of a device of the above stated character, which may be in the form of an attachment for a tractor or similar motor-propelled vehicle or may be transported on a small vehicle drawn manually or by draft animals.

Another object of this invention is the provision of a power driven suction device, having means connected thereto for gathering various seeds and an exhaust means for directing the collected seeds into sacks and similar containers or if desired directly into a trailing vehicle.

With these and other objects in view as will become more apparent as the description proceeds, the invention consists in certain novel features of construction, combination and arrangement of parts which will be hereinafter more fully described and claimed.

For a complete understanding of my invention, reference is to be had to the following description and accompanying drawing, in which Figure 1 is a fragmentary side elevation, partly in section, illustrating the apparatus, constructed in accordance with my invention for removing and gathering seeds from growing grass or other growth.

Figure 2 is a fragmentary top plan view illustrating the apparatus.

Referring in detail to the drawing, the numeral 5 indicates a platform including a portion which will permit said platform to be conveniently mounted on the forward end of a tractor 6 with said platform disposed horizontally for the support of a suction apparatus 7.

The suction apparatus 7 includes a housing 8 in which is rotatably mounted a suction fan 9 belted to a power takeoff on the tractor 6, as shown at 10. The exhaust port of the housing 8 has connected thereto a conduit 11 which extends rearwardly over the tractor and may terminate a limited distance beyond the rear end of said tractor for discharging into a trailer drawn by said tractor or any other collection device. The conduit 11 throughout its length may be supported at spaced intervals by any suitable means on the tractor.

To remove seeds from growth, the growth should be shaken or vibrated in order to dislodge the seeds therefrom and in order that the apparatus may accomplish such work, a scoop 34 is pivotally mounted on the platform by a bracket or brace 35 and is connected to an intake port of the fan housing by a conduit 36. At the forward end of the scoop are located ground wheels 37 secured on an axle 38 journaled to the receiving end of the scoop. A series of radially arranged blades 39 are secured to the axle and operate in the mouth of the scoop and slightly in advance thereof between the ground wheels so as to engage the growth for threshing the seeds therefrom, the seeds falling into the scoop and are taken up therefrom by the suction from the fan and discharged into the collection device associated with the conduit 11.

It is preferable that the bracket 35 be pivoted on the platform so that the scoop may rise and fall with the unevenness of the ground during the passing of the wheels 37 thereover.

The apparatus described and shown in the drawing may be constructed on a slightly smaller scale so that it may be mounted on a small land vehicle which may be manually propelled or drawn by draft animals.

While I have shown and described the preferred embodiment of my invention, it will be understood that minor changes in construction, combination and arrangement of parts may be made without departing from the spirit and scope of the invention as claimed.

Having thus described my invention, what I claim is:

In a gathering apparatus, a suction device, means for mounting said device on a motor vehicle, means carried by said vehicle to receive material from the suction device, a conduit connected to the suction device, a scoop including an enlarged mouth and an elongated curved neck directed upwardly and connected to said conduit, a bracket secured to the scoop and pivoted on the vehicle to permit the scoop to rise and fall, an axle journaled on the scoop and traversing the mouth thereof, ground wheels secured to said axle outwardly of the scoop for supporting the mouth thereof a selected distance from the ground, and blades secured to the axle and operating within the mouth for agitating growth to discharge seeds therefrom into the scoop by way of the mouth.

VERNA MAY.